United States Patent [19]
Tullos

[11] 3,774,230
[45] Nov. 20, 1973

[54] INKING PEN CONSTRUCTIONS

[76] Inventor: Aubrey R. Tullos, 1510 Haywood St., Odessa, Tex. 79760

[22] Filed: Jan. 31, 1972

[21] Appl. No.: 222,047

[52] U.S. Cl. .............................. 346/140, 401/198
[51] Int. Cl. ........................................ G01d 15/16
[58] Field of Search ............ 346/140, 139 R, 139 C; 401/198, 199

[56] References Cited
UNITED STATES PATENTS

| | | | |
|---|---|---|---|
| 1,136,648 | 4/1915 | Bristol | 346/139 C |
| 2,800,385 | 7/1957 | Cannon | 346/140 |
| 3,221,361 | 12/1965 | Cline | 401/198 |
| 3,278,976 | 10/1966 | Ward | 401/198 |
| 3,468,612 | 9/1969 | Aston | 401/198 X |
| 3,644,933 | 2/1972 | Tullos et al. | 346/140 |
| 3,653,070 | 3/1972 | Tullos et al. | 346/140 |

Primary Examiner—Joseph W. Hartary
Attorney—William A. Strauch et al.

[57] ABSTRACT

The disclosure has several embodiments of pen tip mounting constructions for use in recording pen systems and connecting assemblies for attaching an inking pen to the recorder arm of a recording pen system. A fiber pen tip has a tubular steel insert or an outer annular bushing or both assuring an open ink passageway through the tip and avoiding clogging which can occur because of the inherent capillary passageways in the tip becoming closed during insertion of the tip into a mounting chamber. One embodiment shows the bushing with an enlarged, knurled or serrated lower end to facilitate replacement of the pen tip in its mounting chamber. The inking pen includes a capillary pen tube having an attachment device thereon for easy, detachable mounting of the inking pen on the recorder arm of a recording apparatus.

17 Claims, 11 Drawing Figures

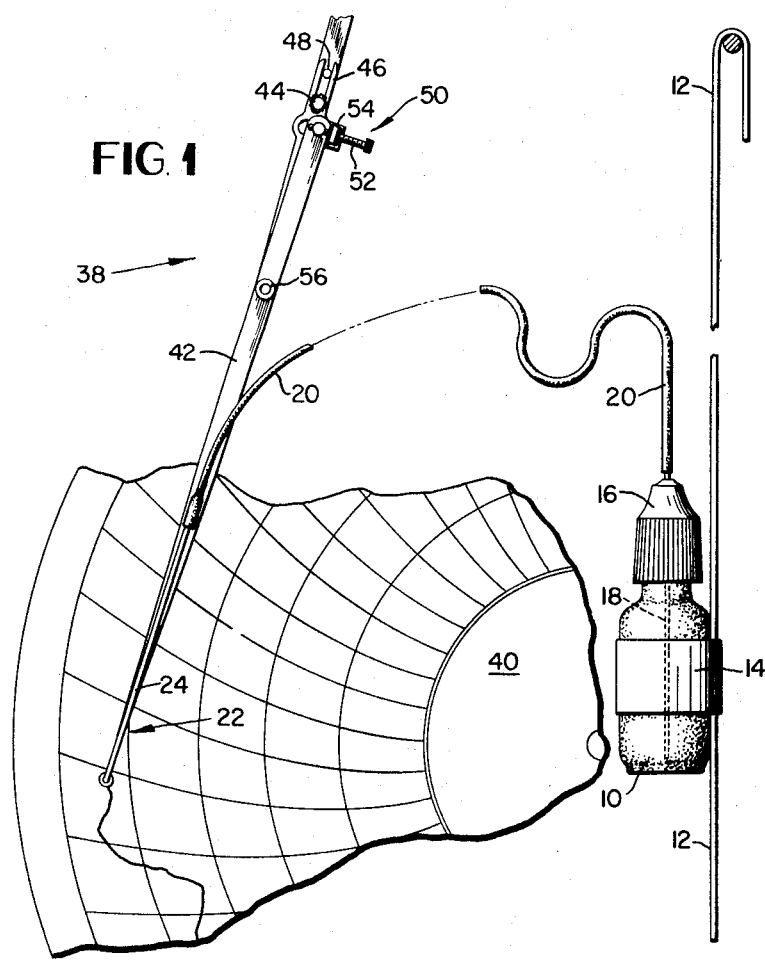
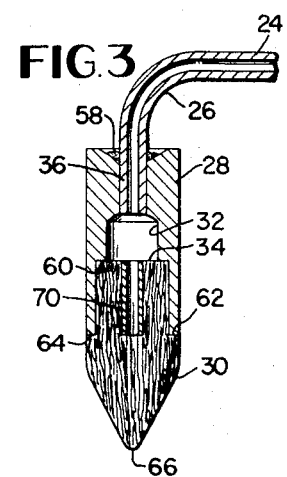
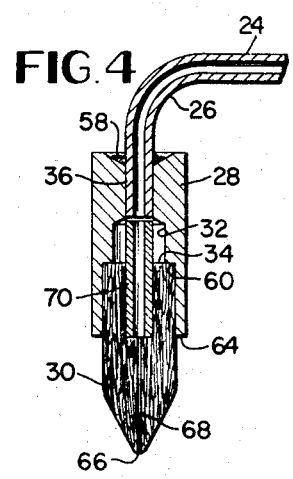
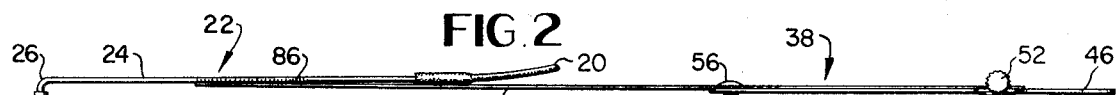
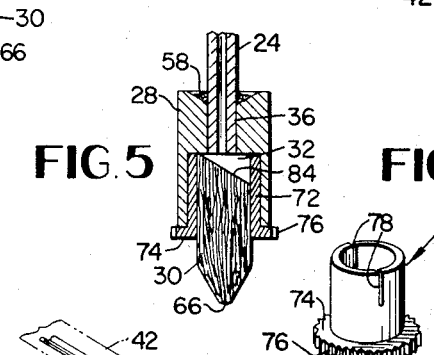
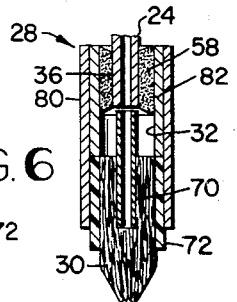
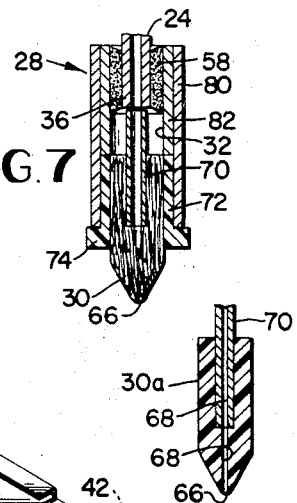
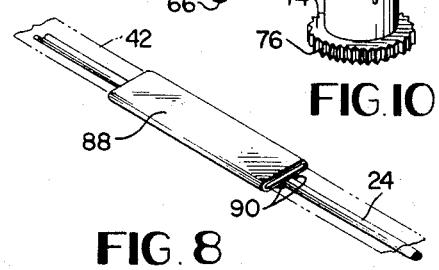
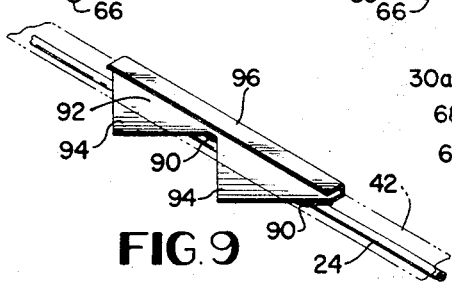

INKING PEN CONSTRUCTIONS

CROSS REFERENCE TO RELATED APPLICATIONS

Capillary pen systems to which the present invention is directed are disclosed in detail in co-pending U.S. application Ser. No. 827,758 filed May 26, 1969 for Reservoir Type Inking Pen System, now U.S. Pat. No. 3,644,933 and in co-pending U.S. application Ser. No. 8,246 filed Feb. 3, 1970 for Nested Sleeve Recording Pen Head, now U.S. Pat. No. 3,653,070.

BACKGROUND OF THE INVENTION

This invention relates to capillary feed inking systems used with a wide variety of recorder apparatuses in drawing fine lines on timed or stationary, drum or circular recorder charts. Specific inking systems and pen head structures are disclosed in the aforementioned co-pending U.S. applications.

Briefly, the inking pen used in such systems comprises a capillary pen tube, connected to a source of ink by a thin, flexible capillary tube, a pen tip mounting chamber into which a solid material or fiber pen tip is inserted, and a clip assembly or silver solder means mounting the pen tube and associated pen tip and mounting chamber onto the recorder arm of a recording apparatus. One or more of the components just described are disclosed in the following U.S. Pat. Nos. 1,179,925; 1,405,409; 1,895,727; 1,917,572; 2,176,777; 2,800,385; 2,800,418; 3,264,652; 3,278,492; and 3,452,359.

Dependable flow action and easy replacement of one or more parts of the inking pen assembly are desired objects not readily disclosed by prior art structures. To this end, an annular bushing is provided on the pen tip to facilitate its replacement in a pen tip mounting chamber, as well as to prevent damage to the pen tip during insertion. A steel tube insert may be provided in the tip to assure an open ink passageway therethrough. A sleeve-like mounting assembly on the pen tube provides facile but firm detachable mounting for the inking pen on the recorder arm of a recording apparatus.

SUMMARY OF THE INVENTION

A primary object of this invention is to provide novel inking pens for inking systems having easily replaced parts which will not be damaged during replacement.

It is an object of the invention to provide the pen tip of an inking pen of the type described with a tubular steel insert which will assure ink flow through the tip under operating conditions.

Another object of the invention is to provide the pen tip of an inking pen with an annular mounting bushing to facilitate removal and replacement of the tip as well as to prevent crushing of the delicate interior structure of the pen tip during insertion whereby ink flow through the pen tip is assured.

A further object of the invention is to provide an inking pen as described with a sleeve-like receptacle for facile mounting of the pen onto the recorder arm of a recording apparatus.

In conjunction with the foregoing enumerated objects, various interchangeable arrangements of inking pen constructions are provided with additional features including a secondary ink reservoir within the mounting chamber of the pen, an abutment shoulder formed interiorly of the mounting chamber for limiting insertion of the pen tip thereinto, a pen tip mounting chamber which may be machined from a single piece of stainless steel tubing, or may comprise an assembly of nested sleeve components which are less expensive to manufacture, and a fine diameter hairline ink passageway formed within the pen tip to the writing surface contact area of the pen tip to assure steady, uninterrupted ink flow to the chart or surface being written upon.

Further novel features and other objects of this invention will become apparent from the following detailed description, discussion and the appended claims taken in conjunction with the accompanying drawings.

BRIEF DESCRIPTION OF DRAWINGS

Preferred structural embodiments of this invention are disclosed in the accompanying drawings in which:

FIG. 1 is a partial diagrammatic view illustrating one embodiment in accord with the invention combined with the inking pen system of a recorder apparatus;

FIG. 2 is a side elevational view of the pen arm shown in FIG. 1;

FIGS. 3 to 7 inclusive are sectional views of various embodiments of the pen tip mounting chamber and pen tip portions which can be utilized with the system shown in FIG. 1, each being drawn to an enlarged scale;

FIGS. 8 and 9 are perspective views of two embodiments of the sleeve-like attachment clip assembly of the invention for mounting the inking pen on the recorder arm of a recorder apparatus;

FIG. 10 is a perspective view of one embodiment of the annular pen tip mounting bushing of the invention; and FIG. 11 is a sectional view of one embodiment of a pen tip with a tubular insert.

DESCRIPTION OF THE PREFERRED EMBODIMENTS

The inking pen system to which the instant invention is directed includes an ink bottle or container 10 retained on a steel wire hanger 12 by means of an encircling band or clip 14. The bottle 10 may be made of resilient plastic and in cooperation with clip 14 is vertically adjustable along the length of hanger 12 to enable proper ink flow. A bottle stopper 16 supports a vertically disposed capillary stinger 18 which projects downwardly into the bottle 10. A suitable length of fine diameter, extremely flexible plastic tubing 20 transfers ink from bottle 10 to the inking pen 22, and more specifically from stinger 18 to pen tube 24. Preferably, both stinger 18 and pen tube 24 are made of stainless steel capillary tubing of extremely small dimensions (0.0355 inch O.D. × 0.023 inch I.D.) while plastic tubing 20 is made of "Tygon" plastic (0.059 inch O.D. × 0.028 inch I.D.); in both cases, dimensions are not critical.

Pen tube 24 is bent through an angle of approximately 90° at 26 and terminates in an inking pen head structure which basically comprises a pen tip mounting chamber 28 having a pen tip 30 inserted or spigotted up into the bottom thereof. Chamber 28 may be constructed to form an internal secondary ink reservoir 32 therewithin, between top 34 of pen tip 30 and ink inlet end 36 of pen tip mounting chamber 28.

The portions of the circular chart recorder shown include an operating recorder arm 38 and circular chart 40, which is normally rotated by a timed drive and produces a timed recording in conjunction with movement of recorder arm 38 responsive to some condition being recorded.

In a preferred embodiment, recorder arm 38 comprises a flat, thin elongate stainless steel leaf spring extension 42 removably secured to the main body of recorder arm 34 by means of a thumb screw 44 engaging bifurcated end 46 of spring extension 42. A location pin 48 assures lateral stability of the structure.

Controlled lateral positioning of inking pen 22 is provided by adjustment assembly 50 for precise calibration of the recorder apparatus with respect to the chart. Assembly 50 includes a micrometer screw 52 threaded through a post 54 to laterally adjust spring extension 42 about a pivot 56. Further details of this precise structure are adequately set forth in prior U.S. Pat. Nos. 2,752,220 and 3,264,652.

Referring now to FIGS. 3 to 7 and 11 in particular, various embodiments of the tubular ink passageway insert means of the invention will be discussed in detail. In the embodiments shown in FIGS. 3, 4 and 5, pen tip mounting chamber 28 comprises a single machined element of tubular steel bonded to the lower terminal end of pen tube 24 by silver solder 58, at the ink inlet end 36 of chamber 28. An abutment shoulder 60 may be machined therein to provide a stop for limiting insertion of pen tip 30 thereinto, thereby assuring proper assembly of the structure. In addition, pen tip 30 may be formed with an annular insertion limitation shoulder 62 (FIG. 3) cooperating with the lower, peripheral skirt portion 64 of chamber 28. As shown in FIGS. 3 and 4, secondary ink reservoir 32 is formed internally of chamber 28 to provide an ink supply located as close as possible to writing surface contact area 66 of pen tip 30 so that an uninterrupted inked line is produced on the chart being recorded.

Preferably, pen tip 30 comprises a bundle of stranded material, inherently defining a multitude of extremely fine diameter capillary ink passageways oriented vertically from top 34 to writing surface contact area 66. The material may be a stranded synthetic material such as nylon, or compressed bamboo fibers. Alternatively, the pen tip may be formed of a solid synthetic material such as nylon (FIG. 11 numeral 30a) and have a hairline capillary ink passageway 68 formed vertically concentrically therewithin. As shown in FIG. 4, a fiber pen tip may also have such a passageway formed therein which in this case will be of greater diameter than the capillary passageways inherently formed in the fibrous material constituting the pen tip 30.

An ink passageway insert 70 is located concentrically within fiber pen tip 30, extending from a point above writing surface contact area 66, adjacent lower skirt 64 of chamber 28, to at least top 34 of pen tip 30 (FIG. 3) or, alternatively, through secondary ink reservoir 32, to the lower end of ink inlet 36 of chamber 28, in fluid communication with pen tube 24 (FIG. 4). In either case, insert 70 is preferably a short segment of capillary stainless steel tubing whose dimensions may be the same as pen tube 28 (FIG. 4) or may be somewhat smaller (FIG. 3).

The function of insert 70 is to assure at least a single open capillary passageway through that portion of pen tip 30 housed interiorally of chamber 28, above skirt 64, after insertion of tip 30 into chamber 28. Due to the delicate construction of the fibers constituting tip 30, it is possible that the inherent capillary passageways therein could be crushed and thus closed during insertion of tip 30, thereby causing an undesirable ink blockage in tip 30. The insert assures fluid communication through pen tip 30 regardless of any damage to the upper portion of pen tip during mounting. With respect to FIG. 11, such an insert 70 may be used in a solid pen tip 30a as well for the same purpose, in that the upper portion of ink passageway 68 might tend to be closed during insertion of pen tip 30a; insert 70 assures that ink flow through pen tip 30a will occur.

FIGS. 5, 6 and 7 illustrate other constructions providing the same function as just described. In place of insert 70 (FIG. 5) or in combination therewith (FIGS. 6 and 7), an annular pen tip mounting bushing 72 may be provided about the upper portion (substantially the upper half) of pen tip 30 to prevent crushing of the capillary passageways (pen tip 30) or capillary passageway (pen tip 30a) during insertion of the pen tip into chamber 28. In one embodiment, bushing 72 is made of brass (FIG. 5) and may include an enlarged lower annular flange 74 which, in combination with lower peripheral skirt 62 of chamber 28, serves as an abutment stop, limiting insertion of pen tip 30 and bushing 72 into chamber 28. The outer periphery 76 of flange 74 may be serrated or knurled (FIGS. 5 and 10) to provide an easily graspable surface for inserting pen tip 30 into chamber 28. A pair of slots 78, 78 may be formed in the upper half of bushing 72, aligned with the long axis thereof (FIG. 10) to allow slight spring compression of bushing 72 during insertion to ease the insertion process and to provide a slight bias force retaining the bushing in the pen head chamber.

Alternative embodiments of bushing 72 are illustrated in FIGS. 6 and 7. The bushing 72 may be made of a synthetic material such as nylon, and need not have a flange 74 (FIG. 6) or the flange 74 may have a smooth periphery (FIG. 7) instead of a knurled periphery. Chamber 28 may be made of nested sleeve components including a long, outer component 80 and a shorter, inner component 82, the bottom periphery of which serves as an abutment stop for bushing 72 to limit insertion of pen tip 30 into chamber 28. Components 80 and 82 are bonded together at ink inlet end 36 of chamber 28 by suitable bonding means such as silver solder 58.

A secondary ink reservoir 32 is not mandatory in the construction of inking pens within the scope of this invention, but such a chamber is a desired feature. Instead of being formed within chamber 28 as shown in FIGS. 3, 4, 6 and 7, reservoir 32 may be formed as illustrated in FIG. 5, wherein the top of pen tip 30 is cut at an angle to form a slanted planar surface 84 extending from the top of bushing 72 at one side down to a point mesially interiorally of bushing 72 at the other side.

Turning now to FIGS. 8 and 9, embodiments of the sleeve-like clip assembly for connecting pen tube 24 to recorder arm 38, or to the free end of leaf spring extension 42 thereof, will be discussed in detail. Of course, pen tube 28 may be directly attached to spring 42 in conventional fashion by suitable bonding material such as silver solder 86 as depicted in FIG. 2. Alternatively, a long, flat generally rectangular tubular steel sleeve 88 is silver soldered as at 90 or otherwise suitably mounted on pen tube 24 (FIG. 8) and is arranged to frictionally engage the free outer end of leaf spring extension 42 of recorder arm 38, as shown in dot and dash lines. The internal configuration and dimensions of sleeve 88 approximate the external configuration and dimensions of spring 42 for a snug, yet easily detachable friction engagement therewith. Preferably, the length of sleeve 88 is substantially greater than its width in order to assure lateral stability of the inking pen on the recorder arm in the assembled state. If desired, sleeve 88 may be lightly crimped onto spring 42 for further security.

Another embodiment of a sleeve-like receptacle for interconnecting the ink pen tube 24 and recorder arm 38 is shown in FIG. 9. The base of the receptacle is an elongated planar flat 92 having a pair of wing like projections 94, 94 formed on one long side thereof and an elongate strip 96 on the other side. In assembling the structure, strip 96 is folded to form a channel as shown in FIG. 9, spring 42 is slid into place, and a pair of wings 94, 94 are folded over the other side of spring 42 to frictionally interengage pen tube 24 with recorder arm 38. The dual wings 94, 94 and/or strip 96 may be crimped onto spring 42 for further security, and together provide lateral stability of the inking pen on the recorder arm during operation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An inking pen for use with a recorder apparatus, said apparatus having recorder arm means, said inking pen comprising a capillary pen tube, a writing pen head at one end of the tube, said writing pen head comprising a pen tip mounting chamber, a pen tip inserted through the bottom of an into said chamber, means defining an ink inlet at the top of said chamber arranged for fluid communication with said capillary pen, ink passageway insert means located in said pen tip for preventing ink clogging in said pen tip extending from a point above the writing surface contact area of the pen tip to an open end adjacent the top of the pen tip and in fluid communication with said chamber ink inlet, and an annular pen tip mounting bushing telescoped over an upper portion of said pen tip to ease insertion of said pen tip into said pen tip mounting chamber and to facilitate removal of said pen tip from said pen tip mounting chamber for replacement by a fresh pen tip, and means detachably connecting the pen tube and recorder arm together comprising a sleeve receptacle, a free end of the recorder arm means being slidably insertable therein for frictional engagement therewith, said pen tube also being attached to said sleeve receptacle, said recorder arm means comprising a recorder arm with a thin elongate flexible leaf spring extended therefrom, said recorder arm means free end being a free end of said leaf spring, said sleeve receptacle comprising a flat, rectangular tubular member having a length substantially greater than its width to prevent lateral movement of the inking pen with respect to said leaf spring free end when the pen tube and leaf spring are connected together.

2. An inking pen as defined in claim 1, wherein said means connecting the pen tube and sleeve receptacle together comprise silver solder.

3. An inking pen as defined in claim 1, wherein said recorder arm means further comprise means detachably connecting said leaf spring to said recorder arm.

4. An inking pen as defined in claim 3, wherein said leaf spring further includes means for selectively laterally positioning said leaf spring and inking pen with respect to said recorder arm means.

5. An inking pen as defined in claim 1, wherein the configuration of said leaf spring free end in cross section approximates the internal configuration of said sleeve receptacle in cross section for frictional engagement therewith.

6. An inking pen as defined in claim 1, wherein said pen tip mounting chamber includes means defining a secondary ink reservoir therein, extending from the top of said pen tip to the lower end of said chamber ink inlet, said ink passageway insert means comprising a narrow diameter stainless steel capillary tube segment extending upwardly to the bottom of said secondary ink reservoir.

7. An inking pen as defined in claim 1, wherein said pen tip mounting chamber includes means defining a secondary ink reservoir therein, extending from the top of said pen tip to the lower end of said chamber ink inlet, said ink passageway insert means comprising a narrow diameter stainless steel capillary tube segment extending upwardly to the lower end of said chamber ink inlet.

8. An inking pen as defined in claim 1, wherein said annular pen tip mounting bushing further comprises an outer annular flange at its bottom end abutting the lower peripheral skirt edge of said pen tip mounting chamber for limiting insertion of said bushing into said chamber and for providing an accessible portion enhancing removal of said bushing and pen tip.

9. An inking pen as defined in claim 8, wherein the outer diameter of said bushing annular flange is greater than the outer diameter of said pen tip mounting chamber lower peripheral skirt edge.

10. An inking pen as defined in claim 9, wherein said annular flange is serrated on the outer surface thereof.

11. An inking pen as defined in claim 1, wherein said annular pen tip mounting bushing is made of brass.

12. An inking pen as defined in claim 11, wherein the upper annular portion of said bushing further comprises means defining at least one slot through a side wall thereof, substantially parallel the long axis of the bushing, to provide means permitting flexing compression of the upper end of said bushing to ease insertion of said bushing into said pen tip mounting chamber.

13. An inking pen as defined in claim 1, wherein said annular pen tip mounting bushing is made of nylon.

14. An inking pen as defined in claim 1, wherein said pen tip comprises a fiber pen tip having inherent extremely fine diameter capillary passageways formed therein for passage of ink completely therethrough.

15. An inking pen as defined in claim 14, wherein said fiber pen tip comprises a bundle of stranded synthetic material.

16. An inking pen as defined in claim 15, wherein said snythetic material is nylon.

17. An inking pen as defined in claim 14, wherein said fiber pen tip comprises a bundle of bamboo strands.

* * * * *

UNITED STATES PATENT OFFICE
CERTIFICATE OF CORRECTION

Patent No. 3,774,230         Dated November 20, 1973

Inventor(s) Aubrey R. Tullos

It is certified that error appears in the above-identified patent and that said Letters Patent are hereby corrected as shown below:

Column 1, line 31 correct "3,278,492" to read --3,278,942--

Signed and sealed this 2nd day of April 1974.

(SEAL)
Attest:

EDWARD M.FLETCHER,JR.　　　　　　　　C. MARSHALL DANN
Attesting Officer　　　　　　　　　　 Commissioner of Patents